US011003716B2

(12) United States Patent
Bonin et al.

(10) Patent No.: US 11,003,716 B2
(45) Date of Patent: May 11, 2021

(54) DISCOVERY, CHARACTERIZATION, AND ANALYSIS OF INTERPERSONAL RELATIONSHIPS EXTRACTED FROM UNSTRUCTURED TEXT DATA

(71) Applicant: INTERNATIONAL BUSINESS MACHINES CORPORATION, Armonk, NY (US)

(72) Inventors: Francesca Bonin, Dublin (IE); Elizabeth M. Daly, Monkstown (IE); Lea A. Deleris, Paris (FR); Stephane Deparis, Dublin (IE); Yufang Hou, Dublin (IE); Charles A. Jochim, Dublin (IE); Yassine Lassoued, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 866 days.

(21) Appl. No.: 15/402,287

(22) Filed: Jan. 10, 2017

(65) Prior Publication Data
US 2018/0197088 A1 Jul. 12, 2018

(51) Int. Cl.
G06F 16/901 (2019.01)
G06N 5/02 (2006.01)
G06F 40/30 (2020.01)

(52) U.S. Cl.
CPC .......... *G06F 16/9024* (2019.01); *G06F 40/30* (2020.01); *G06N 5/025* (2013.01)

(58) Field of Classification Search
CPC .. G06F 16/9024; G06F 17/2785; G06N 5/025
See application file for complete search history.

(56) References Cited

U.S. PATENT DOCUMENTS

| 8,001,144 B2 | 8/2011 | Novak |
| 8,954,500 B2 | 2/2015 | Marlow et al. |
| 10,423,726 B2 * | 9/2019 | Bacarella .............. G06F 16/367 |
| 10,607,148 B1 * | 3/2020 | Niewczas .............. H04L 67/02 |

(Continued)

FOREIGN PATENT DOCUMENTS

WO 2012115962 A1 8/2012

OTHER PUBLICATIONS

Alexandra Balahur et al. "Detecting Implicit Expressions of Sentiment in Text Based on Commonsense Knowledge", Jun. 24, 2011, Department of Software and Computing Systems University of Alicante ,pp. 53-60 (Year: 2011).*

*Primary Examiner* — Kamran Afshar
*Assistant Examiner* — Imad Kassim
(74) *Attorney, Agent, or Firm* — Griffiths & Seaton PLLC

(57) ABSTRACT

Embodiments for discovery and analysis of interpersonal relationships from a collection of unstructured text data by a processor. A relationship between one or more entities and extracted text data from a plurality of unstructured text data may be identified such that the relationship includes a sentiment of the relationship, a type of relationship, temporal information, or a combination thereof. The one or more entities may be associated with a knowledge graph based on an ontology of concepts representing a domain knowledge. The extracted information and the identified relationship may be automatically aggregated into a multi-graph representation.

20 Claims, 17 Drawing Sheets

(56) References Cited

U.S. PATENT DOCUMENTS

| | | | |
|---|---|---|---|
| 2009/0119157 A1* | 5/2009 | Dulepet | G06F 17/2785 705/7.29 |
| 2011/0231448 A1* | 9/2011 | Cai | G06F 16/951 707/792 |
| 2013/0268262 A1* | 10/2013 | Moilanen | G06F 17/28 704/9 |
| 2014/0358523 A1* | 12/2014 | Sheth | G06F 17/2785 704/9 |
| 2016/0021249 A1* | 1/2016 | Govande | H04M 3/436 455/414.1 |
| 2016/0371618 A1* | 12/2016 | Leidner | G06N 5/025 |
| 2017/0315984 A1* | 11/2017 | Goyal | G06F 17/277 |
| 2017/0339087 A1* | 11/2017 | Jeon | H04L 51/16 |
| 2018/0165582 A1* | 6/2018 | Cha | G06N 20/00 |
| 2018/0246883 A1* | 8/2018 | Wang | G06F 17/278 |
| 2018/0293313 A1* | 10/2018 | Hauptmann | G06N 5/025 |

* cited by examiner

600

MR. ANDREWS IS A 70-YEAR-OLD MAN WITH CONGESTIVE HEART FAILURE AND DIABETES. HE USES A CANE WHEN WALKING AND RECENTLY HAS HAD SOME MILD MEMORY PROBLEMS. 

HIS PRIMARY CARE PHYSICIAN, DR. ALAN BROWN, IS PART OF A SMALL GROUP PHYSICIAN PRACTICE FOCUSED ON PRIMARY CARE. MR. ANDREWS ALSO SEES DR. COOPER, A NEPHROLOGIST, AND DR. DAVIES, A CARDIOLOGIST. BOTH SPECIALISTS ARE PART OF A SPECIALTY GROUP PRACTICE THAT IS NOT AFFILIATED WITH DR. BROWN'S CLINIC.

MR. ANDREWS HAS A DAUGHTER WHO LIVES NEARBY BUT WORKS FULL TIME AND THEIR RELATIONSHIP HAS  BEEN STRAINED FOR THE PAST SIX MONTHS.

MR. ANDREWS IS A 70-YEAR-OLD MAN WITH CONGESTIVE HEART FAILURE AND DIABETES. HE USES A CANE DR. ALAN BROWN RECENTLY HAS HAD SOME MILD MEMORY PROBLEMS.

HIS PRIMARY CARE PHYSICIAN, DR. ALAN BROWN, IS PART OF A SMALL GROUP PHYSICIAN PRACTICE FOCUSED ON PRIMARY CARE. MR. ANDREWS ALSO SEES DR. COOPER, A NEPHROLOGIST, AND DR. DAVIES, A CARDIOLOGIST. BOTH SPECIALISTS ARE PART OF A SPECIALTY GROUP PRACTICE THAT IS NOT AFFILIATED WITH DR. BROWN'S CLINIC.

MR. ANDREWS HAS A DAUGHTER WHO LIVES NEARBY BUT WORKS FULL TIME AND THEIR RELATIONSHIP HAS BEEN STRAINED FOR THE PAST SIX MONTHS.

MR. ANDREWS IS A 70-YEAR-OLD MAN WITH CONGESTIVE HEART FAILURE AND DIABETES. HE USES A C[MR. ANDREWS]KING AND RECENTLY HAS HAD SOME MILD MEMORY PROBLEMS.

HIS PRIMARY CARE PHYSICIAN, DR. ALAN BROWN, IS PART OF A SMALL GROUP PHYSICIAN PRACTICE FOCUSED ON PRIMARY CARE. MR. ANDREWS ALSO SEES DR. COOPER, A NEPHROLOGIST, AND DR. DAVIES, A CARDIOLOGIST. BOTH SPECIALISTS ARE PART OF A SPECIALTY GROUP PRACTICE THAT IS NOT AFFILIATED WITH DR. BROWN'S CLINIC.

MR. ANDREWS HAS A DAUGHTER WHO LIVES NEARBY BUT WORKS FULL TIME AND THEIR RELATIONSHIP HAS BEEN STRAINED FOR THE PAST SIX MONTHS.

[MR. ANDREWS AND HIS DAUGHTER'S]

MR. ANDREWS IS A 70-YEAR-OLD MAN WITH CONGESTIVE HEART FAILURE AND DIABETES. HE USES A CANE WHEN WALKING AND RECENTLY HAS HAD SOME MILD MEMORY PROBLEMS.

HIS PRIMARY CARE PHYSICIAN, DR. ALAN BROWN, IS PART OF A SMALL GROUP PHYSICIAN PRACTICE FOCUSED ON PRIMARY CARE. MR. ANDREWS ALSO SEES DR. COOPER, A NEPHROLOGIST, AND DR. DAVIES, A CARDIOLOGIST. BOTH SPECIALISTS ARE PART OF A SPECIALTY GROUP PRACTICE THAT IS NOT AFFILIATED WITH DR. BROWN'S CLINIC.

MR. ANDREWS HAS A DAUGHTER WHO LIVES NEARBY BUT WORKS FULL TIME AND THEIR RELATIONSHIP HAS BEEN STRAINED FOR THE PAST SIX MONTHS.

MR. ANDREWS IS A 70-YEAR-OLD MAN WITH CONGESTIVE HEART FAILURE AND DIABETES. HE USES A CANE WHEN WALKING AND RECENTLY HAS HAD SOME MILD MEMORY PROBLEMS.

HIS PRIMARY CARE PHYSICIAN, DR. ALAN BROWN, IS PART OF A SMALL GROUP PHYSICIAN PRACTICE FOCUSED ON PRIMARY CARE. MR. ANDREWS ALSO SEES DR. COOPER, A NEPHROLOGIST, AND DR. DAVIES, A CARDIOLOGIST. BOTH SPECIALISTS ARE PART OF A SPECIALTY GROUP PRACTICE THAT IS NOT AFFILIATED WITH DR. BROWN'S CLINIC.

MR. ANDREWS HAS A DR. COOPER AND DR. DAVIES BUT WORKS FULL TIME AND THEIR RELATIONSHIP HAS BEEN STRAINED FOR THE PAST SIX MONTHS.

DOCUMENT — 1210

TEXT: CLIENT IS 70 Y/O MALE LIVING ALONE. DAUGHTER USUALLY BRINGS CLIENT TO APPOINTMENTS AND IS INVOLVED IN HIS CARE. THIS PUTS A STRAIN ON THEIR RELATIONSHIP.

DAUGHTER: "I KNOW MY DAD HATES THAT HE HAS TO DEPEND ON ME BUT WE CAN'T AFFORD ANY OTHER HELP AND I WANT TO BE INVOLVED AS MUCH AS I CAN. I'VE BEEN REAL PLEASED WITH DR. DAVIES CAUSE HE TAKES REAL GOOD CARE OF DAD."

PASSAGE 1 — 1220

SPEAKER: NULL

TEXT: CLIENT IS 70 Y/O MALE LIVING ALONE. DAUGHTER USUALLY BRINGS CLIENT TO APPOINTMENTS AND IS INVOLVED IN HIS CARE. THIS PUTS A STRAIN ON THEIR RELATIONSHIP.

PASSAGE 2 — 1230

SPEAKER: DAUGHTER

TEXT: "I KNOW MY DAD HATES THAT HE HAS TO DEPEND ON ME BUT WE CAN'T AFFORD ANY OTHER HELP AND I WANT TO BE INVOLVED AS MUCH AS I CAN. I'VE BEEN REAL PLEASED WITH DR. DAVIES CAUSE HE TAKES REAL GOOD CARE OF DAD."

PASSAGE — 1410

SPEAKER: DAUGHTER

TEXT: "I KNOW MY DAD HATES THAT HE HAS TO DEPEND ON ME BUT WE CAN'T AFFORD ANY OTHER HELP AND I WANT TO BE INVOLVED AS MUCH AS I CAN. I'VE BEEN REAL PLEASED WITH DR. DAVIES CAUSE HE TAKES REAL GOOD CARE OF DAD. DR. COOPER MUST BE A GOOD DOCTOR TOO BUT HE'S ALWAYS IN A HURRY AND DOESN'T TAKE TIME TO EXPLAIN MUCH TO US. DAD SIMPLY LOVES DR. BROWN. HE'S KNOWN HIM FOR YEARS AND WOULD NEVER SWITCH, BUT I'M NOT SURE HE'S THE BEST AVAILABLE."

PASSAGE FRAGMENTS — 1420

SPEAKER: DAUGHTER

FRAGMENT 1: "I'VE BEEN REAL PLEASED WITH DR. DAVIES CAUSE HE TAKES REAL GOOD CARE OF DAD."

FRAGMENT 2: "DR. COOPER MUST BE A GOOD DOCTOR TOO BUT HE'S ALWAYS IN A HURRY AND DOESN'T TAKE TIME TO EXPLAIN MUCH TO US."

FRAGMENT 3: "DAD SIMPLY LOVES DR. BROWN. HE'S KNOWN HIM FOR YEARS AND WOULD NEVER SWITCH, BUT I'M NOT SURE HE'S THE BEST AVAILABLE."

PASSAGE FRAGMENTS — 1420

SPEAKER: DAUGHTER

FRAGMENT 1: "I'VE BEEN REAL PLEASED WITH DR. DAVIES CAUSE HE TAKES REAL GOOD CARE OF DAD."

FRAGMENT 2: "DR. COOPER MUST BE A GOOD DOCTOR TOO BUT HE'S ALWAYS IN A HURRY AND DOESN'T TAKE TIME TO EXPLAIN MUCH TO US."
FRAGMENT 3: "DAD SIMPLY LOVES DR. BROWN. HE'S KNOWN HIM FOR YEARS AND WOULD NEVER SWITCH, BUT I'M NOT SURE HE'S THE BEST AVAILABLE."

| SOURCE | TARGET | REL. | CONF. |
|---|---|---|---|
| BARBARA ANDREWS | DR. DAVIES | + | 0.9 |
| BARBARA ANDREWS | DR. COOPER | + | 0.4 |
| BARBARA ANDREWS | DR. BROWN | − | 0.6 |
| ... | ... | ... | ... |

DISCOVERY, CHARACTERIZATION, AND ANALYSIS OF INTERPERSONAL RELATIONSHIPS EXTRACTED FROM UNSTRUCTURED TEXT DATA

BACKGROUND OF THE INVENTION

Field of the Invention

The present invention relates in general to computing systems, and more particularly to, various embodiments for discovery, characterization, and analysis of interpersonal relationships automatically extracted from a collection of unstructured text input using a computing processor.

Description of the Related Art

Due to the recent advancement of information technology and the growing popularity of the Internet, a vast amount of information is now available in digital form. Such availability of information has provided many opportunities. Digital and online information is an advantageous source of business intelligence that is crucial to an entities survival and adaptability in a highly competitive environment.

SUMMARY OF THE INVENTION

Various embodiments for discovery and analysis of interpersonal relationships from a collection of unstructured text data by a processor, are provided. In one embodiment, by way of example only, a method for discovery and analysis of interpersonal relationships from a plurality of unstructured text data, again by a processor, is provided. The characterization of a relationship between two or more entities includes a plurality of dimensions including the names (or identifiers "IDs") of the entities involved along with a description of the sentiment of the relationship, which can be qualitative, quantitative and/or even multi-dimensional, a specification of the type of relationship, temporal information relating to the interactions among the entities, or a combination thereof. Other fields may also be added such as, for example, a level of formality in the relationship and/or a measure of variability of the relationships. The entities in a relationship may be associated with information from a knowledge graph assembled from an ontology representing domain knowledge whether general domain (e.g. DbPedia) or other. The output of the extracted information, consisting of the set of identified relationships may be automatically aggregated into a multi-graph representation.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 6 is a conceptual diagram depicting sentiment extraction of text data in accordance with aspects of the present invention;

FIG. 7 is a diagram depicting an exemplary system architecture for name entity recognition in accordance with aspects of the present invention;

FIG. 9 is a diagram depicting an exemplary operation for co-reference resolution in accordance with aspects of the present invention;

FIG. 10 is a diagram depicting an exemplary operation for partial indication matching in accordance with aspects of the present invention;

FIG. 11 is a diagram depicting an exemplary operation for reference by role resolution in accordance with aspects of the present invention;

FIG. 12 is a diagram depicting an exemplary operation for speech attribution in accordance with aspects of the present invention;

FIG. 14 is a diagram depicting an exemplary operation for sentiment input extraction in accordance with aspects of the present invention;

FIG. 15 is a diagram depicting an exemplary operation for sentiment extraction in accordance with aspects of the present invention;

DETAILED DESCRIPTION OF THE DRAWINGS

Figure 1:
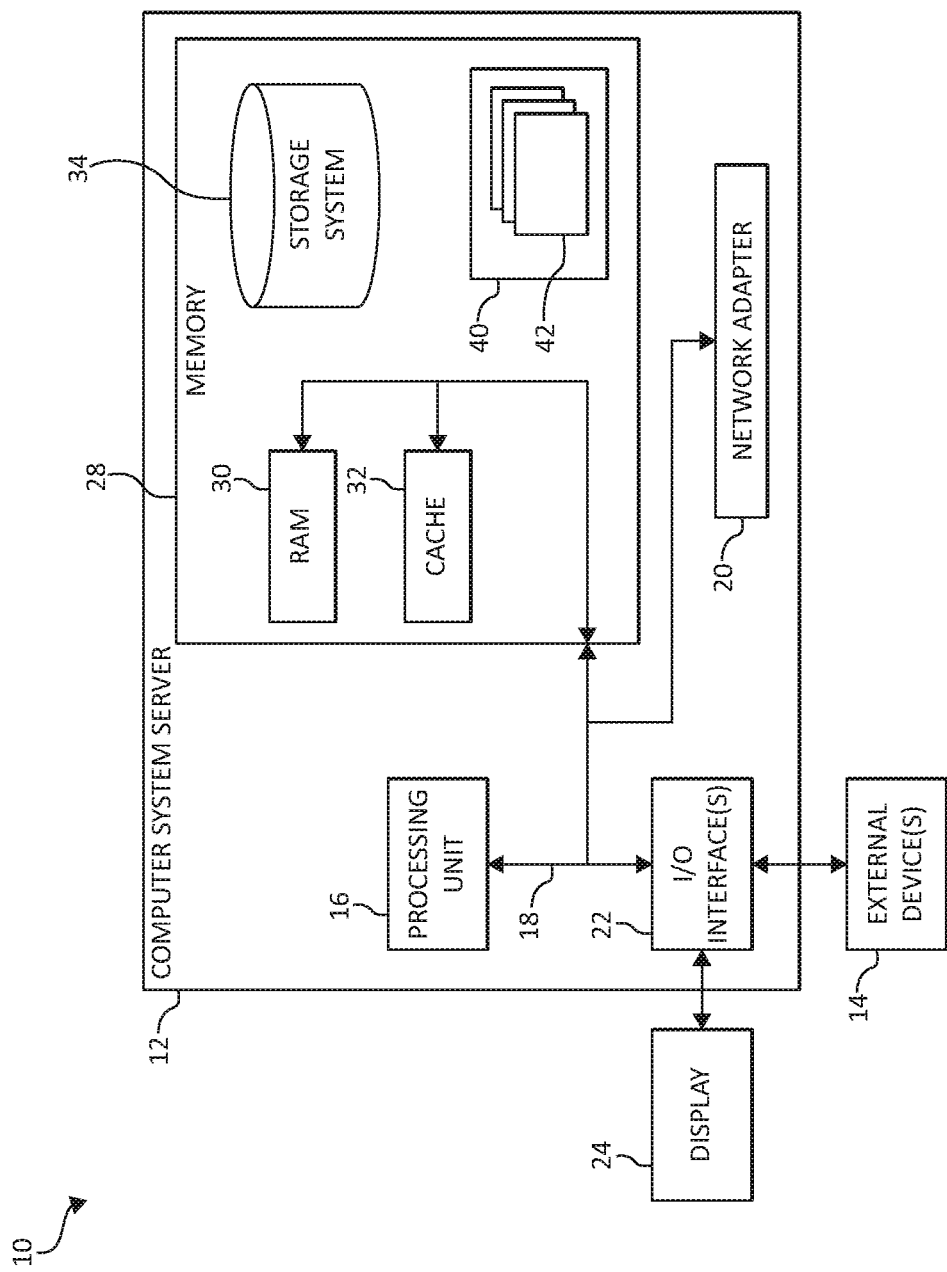
FIG. 1 is a block diagram depicting an exemplary cloud computing node according to an embodiment of the present invention.

As the amount of electronic information continues to increase, the demand for sophisticated information access systems also grows. Digital or "online" data has become increasingly accessible through real-time, global computer networks. The data may reflect many aspects of the behavior of groups or individuals in a population, including scientific, political, governmental, educational, financial, travel, traffic flow, shopping and leisure activities, healthcare, and so forth. Many data-intensive applications require the extraction of information from data sources, such as, for example, within the political, security and counter terrorism, healthcare, government, educational, or business environment.

As such, there is a need to accurately extract and characterize mentions of interpersonal relationship from unstructured text data and then to provide an interface for analysing the extracted output. In one aspect, the extraction of information may be obtained through a knowledge generation process that may include initial data collection among different sources, data normalization and aggregation, and final data extraction.

The mechanisms of the illustrated embodiments provide for discovery and analysis of interpersonal relationships from unstructured text data. The characterization of a relationship between two or more entities includes a plurality of dimensions including the names (or identifiers "IDs") of the entities involved along with a description of the sentiment of the relationship (which can be qualitative, quantitative or even multi-dimensional), a specification of the type of relationship, temporal information relating to the interactions among the entities, or a combination thereof. Other fields could also be added such as the level of formality in the relationship or a measure of its variability. In one aspect, the temporal information may contain date and time information related to a change in sentiment to a relationship (e.g., a change of sentiment of an emotional feeling of like or approval changes to an emotional response of dislike or disapproval). The two or more entities may be associated with a knowledge graph based on an ontology of concepts representing a domain knowledge. The output of the extracted information, consisting of the set of identified relationships may be automatically aggregated into a multigraph representation.

In one aspect, the present invention provides for discovery and analysis of interpersonal relationships automatically extracted from unstructured text input. The present invention takes as input a collection of texts and optionally a knowledge base (DbPedia), processes the text to automatically identify named entities corresponding to persons. A co-reference resolution is performed to identify locations or places where those persons are not referred to by their full names. Once all entities have been resolved (i.e., all mentions identified), the present invention may then proceed to identify mentions of interpersonal relations from the text. The text surrounding (e.g., associated with) interpersonal mentions may be analyzed to characterize the nature (sentiment, intensity, frequency, formality) of that relation. The present invention may provide as output a multigraph of the extracted information.

In other words, the present invention may identify an indication in a plurality of unstructured text data that references the one or more entities. The indication may be assigned to the one or more entities. A co-reference resolution may be performed for the one or more entities referenced in the plurality of unstructured text data by one or more incomplete semantic names relating to the indication. A role resolution may be performed for the one or more entities by annotating the indication with a defined role of the one or more entities. A semantic reference of one or more interpersonal relationships between the one or more entities from the plurality of unstructured text data may be detected. Surrounding text (e.g., text data preceding and subsequent to the semantic reference) in the plurality of unstructured text data may be analyzed to characterize a semantic relationship according to a sentiment, a frequency, emotional state, relationship hierarchy, or a combination thereof. A multigraph representation may be displayed in an interactive graphical user interface (GUI).

In an additional aspect, the present invention enables a user to select a set of input texts to be analyzed. A graphical user interface (GUI) may be provided for users to visualize the multigraph that results from the automatic relationship mention extraction and to further interact and/or "reason" with the GUI via for instance knowledge propagation. The present invention may aggregate information (over time, over sentiment categories), visualize temporal relations over time (via the GUI), and/or scrutinize each atomic piece of extracted information underneath each relationship mention (with the possibility of editing/correcting the extracted information).

As will be further described, in various embodiments, the mechanisms of the present invention may take a collection of text data and a knowledge graph, which may define, describe, and/or provide information pertaining to one or more entities mentioned or referenced in the text data. In one aspect, the knowledge graph may be a social network graph and/or may reference linked data (e.g., DbPedia—which presents structured knowledge from Wikipedia using semantic web expressions). The text data, which may be unstructured text data, may be processed such that one or more indications or "mentions" of interpersonal interactions with the one or more entities may be automatically extracted from the text data. Using the extracted data, the social graph of the mentioned entities may be enhanced and further developed using the extracted data, both from the input text and from any additional input graph data.

A type and a level of intensity or closeness (e.g., a degree of intensity or closeness which may be determined by a defined range) of the expressed sentiment between the mentioned entities (e.g., persons) may be extracted from the text data both punctually and over a selected period of time. The extracted data may be provided as a multi-graph representation of the relationship between the entities and the extracted sentiments matching and associated with the entities.

In one aspect, the text data or "input data" may be a collection of text documents, each with associated metadata including at least a known author and/or a time stamp. The author may be a person of interest (e.g., one from a network) or may be anonymous ("NULL"). Additional metadata (e.g., document source) may be considered and used. Optionally, an external graph of relationships between entities (e.g., persons) mentioned in one or more documents may be determined.

A user may be presented with the multi-graph representation via a graphical user interface (GUI) to enable the user to further interact with the output (e.g., the multi-graph representation) to reason on the graph (knowledge propagation). The multi-graph representation may be aggregated with additional, extracted sentiment information over a defined time period and include one or more sentiment categories. The multi-graph representation may also provide visualized, temporal relations over the defined time period. Each atomic piece of extracted sentiment information relating to each relationship mentioned or indicated may also be analyzed such that information may further be corrected or edited.

As used herein, the terms "interpersonal relationship", "relation", "interpersonal interaction", "relationship" may refer to indications or mentions of a relationship between two or more entities. An interpersonal relationship can be characterized by names of the entities in the relationship (e.g., a source name and target name), labels or "roles" of the entities (e.g., president, father, opponent, boss, sister, relative, etc.). The interpersonal relationship can be characterized by qualitative descriptions of the relationship such as, for example, a sentiment score that may be within a defined range, such as between a negative value ("−1" or simply "negative") and positive value ("+1" or simply "positive"). The qualitative descriptions of the relationship may also include a category of emotions such as, for example, happiness, sadness, anger, disgust, joy, and the like. The qualitative descriptions of the relationship may also include an intensity, a formality, and whether the relations are cooperative in nature or adversarial in nature. The frequency and duration of the relationship may also be included in the qualitative description. Additionally, the interpersonal relationship can be characterized by a timestamp, particularly since a social relationship may evolve or change over time. Furthermore, the interpersonal relationship can be characterized by location. Entities that take part in the interpersonal relationship do not need to be limited to humans and can also apply to other types of entities such as legal entities (corporations, governmental entities, non-governmental organization "NGO", animals, brands, and among others).

In one aspect, a thesaurus or ontology as source for the knowledge graph may be used for the identification of the relationships between the extracted, sentiment text data and one or more entities. That is, the ontology may also be used to as input information as a piece of evidence for the identification of the sentiment relationships between extracted data and each entity.

In one aspect, the term "domain" is a term intended to have its ordinary meaning. In addition, the term "domain" can include an area of expertise for a system or a collection of material, information, content and/or other resources related to a particular entity or subject or subjects relating to the entities. For example, a domain can refer to governmental, financial, healthcare, advertising, commerce, scientific, industrial, educational, medical and/or biomedical-specific information. A domain can refer to information related to any particular entity and associated data that may define, describe, and/or provide a variety of other data associated with one or more entities. The domain can also refer to subject matter or a combination of selected subjects.

The term ontology is also a term intended to have its ordinary meaning. In one aspect, the term ontology in its broadest sense may include anything that can be modeled as ontology, including but not limited to, taxonomies, thesauri, vocabularies, and the like. For example, an ontology may include information or content relevant to a domain of interest or content of a particular class or concept. Content can be any searchable information, for example, information distributed over a computer-accessible network, such as the Internet. A concept can generally be classified into any of a number of concepts which may also include one or more sub-concepts. Examples of concepts may include, but are not limited to, scientific information, healthcare information, medical information, biomedical information, business information, educational information, commerce information, financial information, pricing information, information about individual people, cultures, groups, sociological groups, market interest groups, institutions, universities, governments, teams, or any other information group. The ontology can be continuously updated with the information synchronized with the sources, adding information from the sources to the ontology as models, attributes of models, or associations between models within the ontology.

In this way, the mechanisms of the present embodiment provide one or more advantages over the current state of the art in that the present invention, as described herein, may provide insights into relationships described through free text in many different sources. For example, in the health and social care industry, the existence and nature of relationships are essential to determine the health and support resources available to a patient. Automatically extracting text data from case notes can provide an overview of these relationships without having to manually read through them and record the information. In the business and organizational realm, business analytics and market analysis harness information such as, for example, from companies that are competing, collaborating or merging. Discussions either in the news, social media or other text documents can provide an opportunity to collect such data. Information may be extracted through analysis of case notes, email, social network communications and posts, and/or through the processing of conversational transcripts. Key players in a group or social network may also be identified and located. As an additional example, as pertaining to political and social science, understanding allegiances and divisions between political figures can provide insights into the political network. For example, analysis of voting records may assist to identify a member of one political party who more clearly aligns themselves with an alternative political party.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
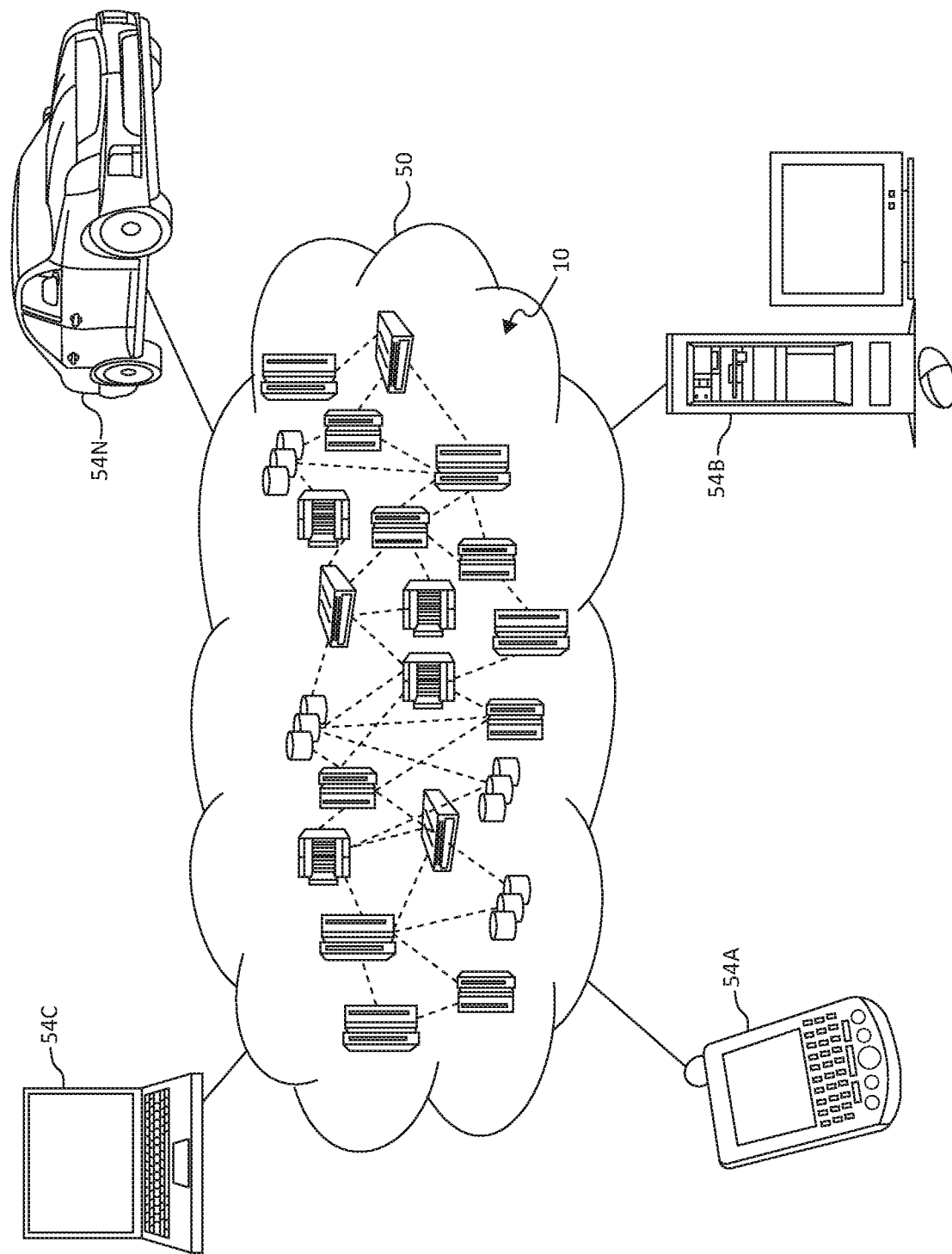
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
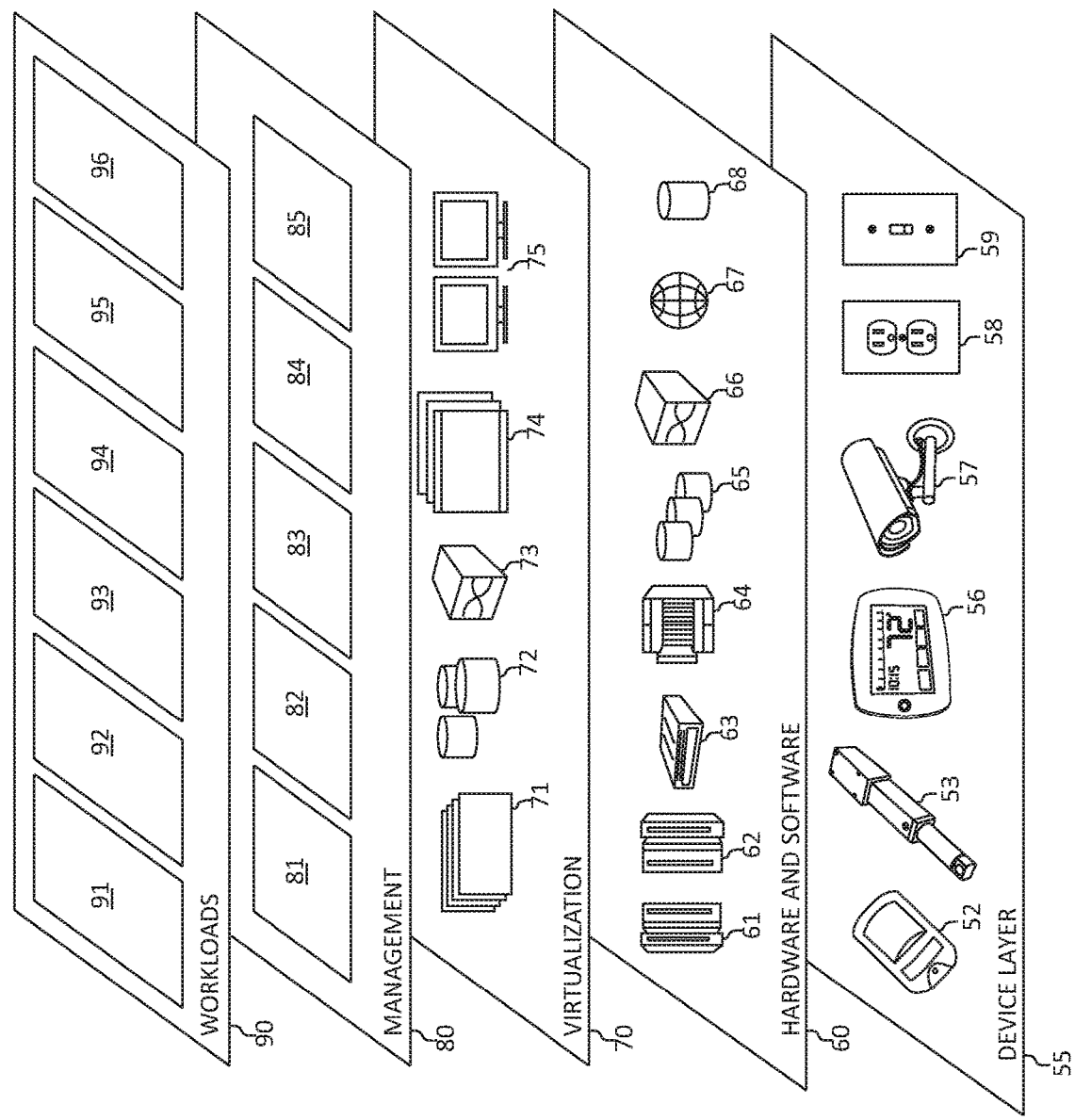
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various sentiment information extraction and relationship analysis workloads and functions 96. In addition, sentiment information extraction and relationship analysis workloads and functions 96 may include such operations as data analysis (including data collection and processing from various environmental sensors), and predictive data analytics functions. One of ordinary skill in the art will appreciate that the sentiment information extraction and relationship analysis workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
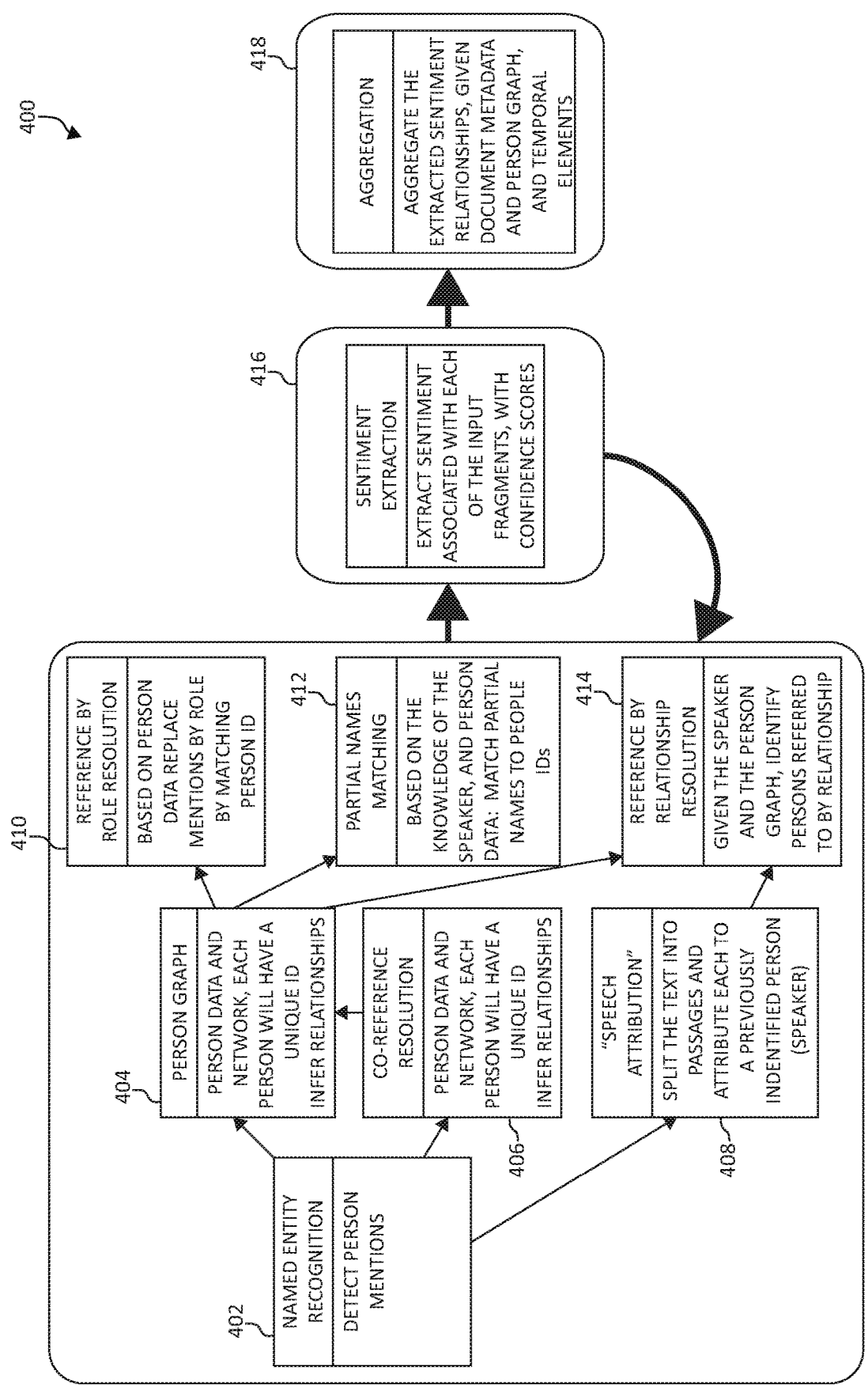
FIG. 4 is a block diagram depicting discovery and analysis of interpersonal relationships from unstructured text data according to an embodiment of the present invention.

FIG. 4 is an additional conceptual diagram depicting various discovery and analysis of interpersonal relationships from text data in accordance with aspects of the present invention. As will be seen, many of the functional blocks may also be considered "modules" of functionality, in the same descriptive sense as has been previously described in FIGS. 1-3. With the foregoing in mind, the module blocks 400 may also be incorporated into various hardware and software components of a system in accordance with the present invention. For example, computer system/server 12 of FIG. 1 may be employed in FIG. 4, incorporating processing unit 16 to perform various computational, data processing and other functionality in accordance with various aspects of the present invention.

By way of example only, various computational, data processing and other functionality workflow is depicted. That is, discovery, characterization, and analysis of interpersonal relationships from unstructured text data is depicted. In one aspect, the present invention may include performing a named entity recognition operation 402 on text data to identify or detect an indication or mention of one or more entities. In parallel, in sequence, and/or iteratively, the workflow of module blocks 400 may perform a speech attribution operation 408, a co-reference resolution operation 406, and/or a person graph operation 404. The speech attribution operation 408 may include dividing the text data into one or more passages of speech and attributing one or more of the passages of speech to an identified entity. It should be noted that upon completion of the speech attribution operation 408, the functionality/workflow may also then perform the reference by relationship resolution 414.

The co-reference resolution operation 406 may be defined as the process of establishing that two expressions refer to the same referent, without necessarily establishing what that referent is. Reference resolution may be the process of establishing what the referent is. To further illustrate, expressions that are co-referential can be referred to as aliases of one another. For examples, expressions "George W. Bush," "the President," "his," "he," and "Bush" form an alias cluster referring to George W. Bush. The co-reference resolution operation 406 may include replacing a shorted indication or alias (e.g., a pronoun of a person) with an entity identifier (ID) referring to the entity, such as a name. The person graph operation 404 may include assigning the unique ID to each entity in an entity graph (e.g., the person graph) having entity data and network (e.g., person data and network).

Following these operations, specifically the person graph operation 404, a reference by role resolution 410, a partial names matching operation 412, and a reference by relationship resolution 414 may be performed, in parallel and/or in sequence and/or iteratively. For example, the reference by role resolution 410 may include replacing an indication or mention of the entity by a label or role upon matching the indication with the entity ID. The partial names matching operation 412 may include matching one or more partial identifiers or names to the entity (person) ID based on a knowledge of the speaker of the text data. The reference by relationship resolution 414 may include identifying one or more entities referred to by the relationship given the speaker and the person graph. For example, a relationship graph may be used to identify communication from person "A" and correlate/identify one or more relationships of alternative persons such, as person "B" with the person A (e.g., person A speaks or emails the phrase " . . . my husband . . . " then it can be resolved that person B is the husband of person A.

Once each of these steps, operations, and functionalities are completed, a sentiment extraction 416 may occur focused on the relationship between two entities. The sentiment extraction 416 process starts with the identification of the text fragments, where the text fragments may be paragraphs, sentences or part of sentences, that may be relevant to the relationship between two entities. This may be performed, for example, by selecting all the sentences in which both entities are mentioned. This could also be performed through the use of a classifier which identifies relevant text fragments. The sentiment extraction process then includes extracting sentiment information associated with the text data (e.g., input fragments) having a confidence score. That is, a classifier may be used to determine the sentiment (e.g., positive or negative) and the classifier may return the sentiment and a score that indicates how confident the classifier is in its decision related to the determination that the sentiment is positive or negative. For example, for some text the classifier might return "positive: 0.65" which could mean the classifier is 65% sure that the text is positive. Other techniques that rely on specific patterns and/or that make use of a syntactic structure of sentences may also be used. The extracted sentiment information/relationships may be aggregated, using an aggregation operation 418, according to the document metadata, person graph, and temporal elements. That is, the extracted sentiment information/relationship data may all be aggregated into a knowledge graph.

Figure 5:
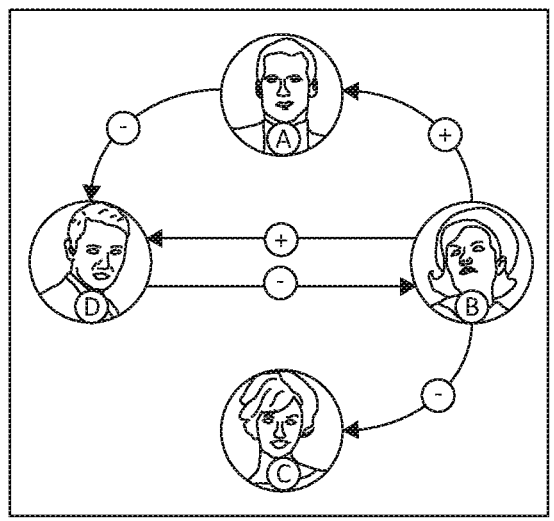
FIG. 5 is an additional diagram depicting an exemplary System Output: knowledge graph with social and sentiment relationships in accordance with aspects of the present invention.

In one aspect, a list of sentiment relationships with confidence scores that are extracted in the sentiment extraction operation may have different (possibly contradictory) sentiment relationships extracted for both a source entity ("source person") and a target entity ("target person"). As such, document metadata may be sourced (speaker, time stamp, etc.) for each relationship. For each source and target person, a set of extracted sentiment relationships may be aggregated by taking into account the confidence scores, document metadata, and person graph. In so doing, the person graph, as depicted in FIG. 5, may be enriched with the social and sentiment relationships. It should be noted that one or more sentiment relationships may exist between two people, with different time stamps.

FIG. 5 is an additional diagram 500 depicting a visual summary of the output of the interpersonal relationship extraction steps in accordance with aspects of the present invention. A person graph 500 or "multi-graph representation" may be enriched with the social and sentiment relationships. For example, the person graph may include person A, person B, person C, and person D. The person graph enables a user to interact with the output of the person graph to reason on the graph (e.g., knowledge propagation, through rules or other approaches). For example, if person A "admires" person B and person B "admires" person C, it is likely and may be reasoned that person A "admires" person C. The sentiment relationships may be indicated by a confidence score, such as a "positive" sign indicating a positive or favorable interpersonal relationship or a "negative" sign indicating a negative or unfavorable interpersonal relationship between the persons, such as person A-D. That is, the positive or negative sign may reflect one or more various types of emotions, such as, for example love, respect, mistrust, jealously, anger, dislike, and the like.

The person graph 500 or "multi-graph representation" may enable a user to interact with the graph (e.g., reason on it for knowledge propagation), aggregate information over time (e.g., indicated using a positive or negative sign for specific emotions, such as love, hate, anger, mistrust, jealousy, dislike, disfavor, like, etc.), visualization of temporal relations, and/or scrutinize each atomic piece of extracted information underneath each relationship mention (with the ability to correct/edit the extracted information).

Stated differently, the sentiment information may be aggregated over a defined time period and include one or more sentiment categories. The multi-graph representation may also provide visualized, temporal relations over the defined time period. Each atomic piece of extracted sentiment information relating to each relationship mentioned or indicated may also be retrieved and presented to the user by selecting one or more links displayed on the person graph 500. The user could then analyze each relationship mentioned or indicated such that information may further be corrected or edited.

In view of the foregoing, consider now the following examples depicted in FIGS. 6 to 15. Turning now to FIG. 6, sample type of input text data is depicted using medical information to illustrate the embodiments of the present invention. For example, the present invention could be applied to extract relationship information from various input data such as, for example, blogs, social media text data, article case notes, narratives, medical records, articles relating to medical information, social media data, reviews, or other communication sources. The objective (?) of FIG. 6 is to understand and extract, for example, a user's (patient) social landscape with the type and nature of relationships among other users involved with the user (e.g., persons involved with the patient's care such as a primary care doctor and the relationship with the primary care doctor— having a positive relationship or negative relationship).

Turning now to FIG. 7, a diagram 700 for performing a name entity recognition. In a document of text (e.g., input text), a named entity recognition operation may be performed on the text data to identify or detect a mention of one or more entities (e.g., "primary care physician" is "Dr. Alan Brown"). The text data may be annotated to include identified or detected mentions and/or provide references to the entities in an external resource. For example, an entity's name, such as "Dr. Brown" may be identified and recognized by a mention in the text data of a role or alias (e.g., "primary care physician"). In one aspect, input data may be a text document and the name entity recognition operation may output annotated text that may include, for example, a person(s) mentions, applicable reference to "persons" entries (e.g., "primary care physician" is "Dr. Alan Brown") in external sources (e.g., DbPedia, FreeBase entries, patient relations data entries, etc.)

Figure 8:
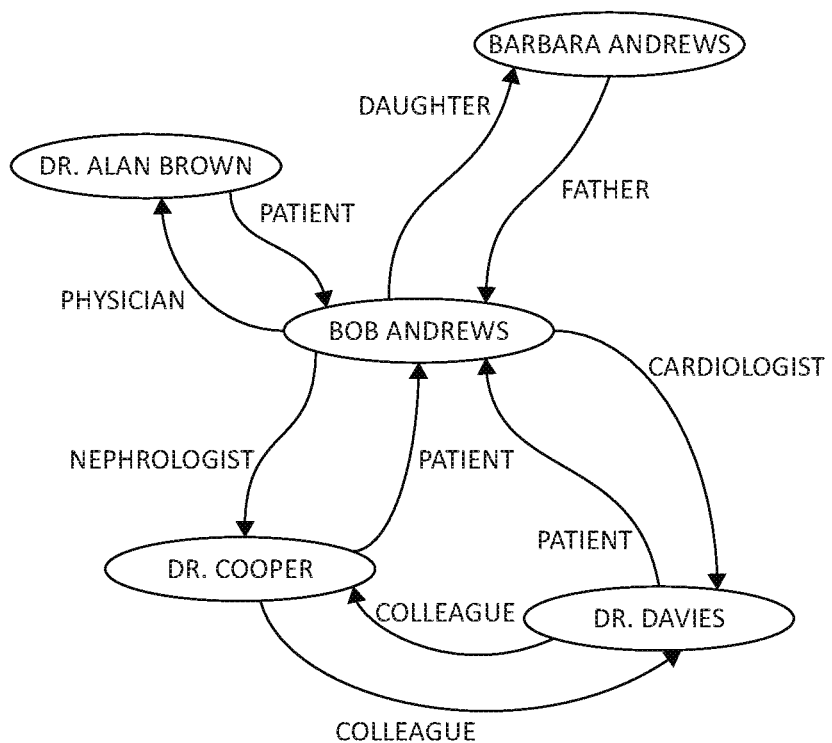
FIG. 8 is a diagram depicting an exemplary method for entity graph extraction by a processor, in which aspects of the present invention may be realized.

As an additional example, FIG. 8 is a diagram 800 depicting an exemplary method for entity graph extraction by a processor. The text data, annotated to include identified or detected indications or mentions, serves as input data and may be used to extract entity data and social relationships from text documents and/or an external source, such as, for example, a DbPedia or a large collaborative knowledge base consisting of data composed mainly by its community members ("FreeBase"), etc. One or more entailments may be computed and one or more new relationships may be inferred using a reasoner. In one aspect, one or more rules of relationships to infer relationship connections that may be missing from a relationship graph.

More specifically, a reasoner (which may be a module or application controlled by a processor device) may be able to apply the one or more rules of relationships to infer relationship arcs that may be missing from the relationship graph. For example, if person A is the spouse of person B then person B is the spouse of person A. As another example, if person A is the father of person B and person B is the father of person C, then person A is the grandfather of person C.

One or more entities mentioned in input text with additional person data (gender, name, role, alternate names, etc.) may be provided in the person graph. For example, person A may be a patient of person B. Person B may be a colleague of Person C. For example, Bob Andrews may be identified as a patient of Dr. Alan Brown. Dr. Alan Brown may be identified as the physician of Bob Andrews. Bob Andrews may be identified as the father of Barbara Andrews. Barbara Andrews may be identified as the daughter of Bob Andrews. Bob Andrews may be identified as a patient of Dr. Davies. Dr. Davies may be identified as the cardiologist of Bob Andrews. Bob Andrews may be identified as a patient of Dr. Cooper. Dr. Cooper may be identified as the nephrologist of Bob Andrews. Dr. Davies and Dr. Cooper may be identified as colleagues of each other. Each indication or mention of the entity by name, role, gender, or alternative names may be extracted from the text data and annotated to each specific, identified entity.

FIG. 9 is a diagram 900 depicting an exemplary operation for co-reference resolution. The text with annotated and additional entity information, as described above, may be used to resolve co-reference (e.g., pronoun references). For example, "Mr. Andrews" may be identified as a reference with the pronouns "He" or "His". More specifically, the co-reference resolution operation may include replacing a shorted indication (e.g., a pronoun "his" of the entity "Mr. Andrews") with an entity identifier (ID), which may be the entities' name itself or an assigned ID, referring to the entity. Thus, output data provides improved annotated text data with co-references that have been resolved.

FIG. 10 is a diagram 1000 depicting an exemplary operation for partial indication matching. As illustrated, FIG. 10 illustrates a text document having one or more heterogeneous entity names for the entity such as, for example, "Dr. Alan Brown", "Dr. Brown's", and the like. The partial indication matching operation may identify various heterogeneous indications or mentions (e.g., names) referring to the same entity and may annotate the entity text with each heterogeneous indication or mention to resolve the heterogeneous name references. For example, "Dr. Alan Brown", "Dr. Brown's" may each be a partial indication or mention (e.g., heterogeneous name references) of the entity name of "Alan Brown". The partial indication matching identifies and matches each of these partial derivatives (e.g., heterogeneous name references) with the entire entity name. The partial indication matching includes annotating the entity name with the partial indication text.

FIG. 11 is a diagram 1100 depicting an exemplary operation for reference by role resolution. The reference role resolution (or "reference-by-role resolution") may include replacing an indication or mention of an entity's role by its full mention. For example, the indication or mention of "specialists" may be replaced by and/or annotated with the text "Dr. Davies and Dr. Cooper". That is, input data may be the annotated text output from a previous operation that may include, for example, entity/person data including the entities or person's role. The output data may be additional annotated text where references to the entities/persons by a role are resolved (e.g., heterogeneous name references are resolved).

Turning now to FIG. 12, a diagram 1200 depicting an exemplary operation for speech attribution. The speech attribution operation may include dividing the text data into one or more passages of speech, documents, or author information attributed to an identified entity. For example, a document, which may be a news article, letter, memo, speech, a short message service ("SMS") message, a multimedia messaging service (MMS), email, or other type of document or text of a communication message, may be divided into one or more passages of text, such as passage 1 and/or passage 2, as in block 1210. The author or "speaker" of the document, or more specifically, each of the divided speakers, may be identified as in blocks 1220 and 1230. For example, the document of block 1210, which may be fragmented into one or more passages, may attribute the text to an identified speak entity, such as "Daughter" in passage 2, as in block 1230. A "null" value may be assigned (e.g., anonymous value) when the speech attribution operation is unable to determine the author or speaker of the passage such as, for example, passage 1, as in block 1220. The speech attribution operation may annotate an entity with an annotation of being the speaker of extracted text data from a group of text data.

Figure 13:
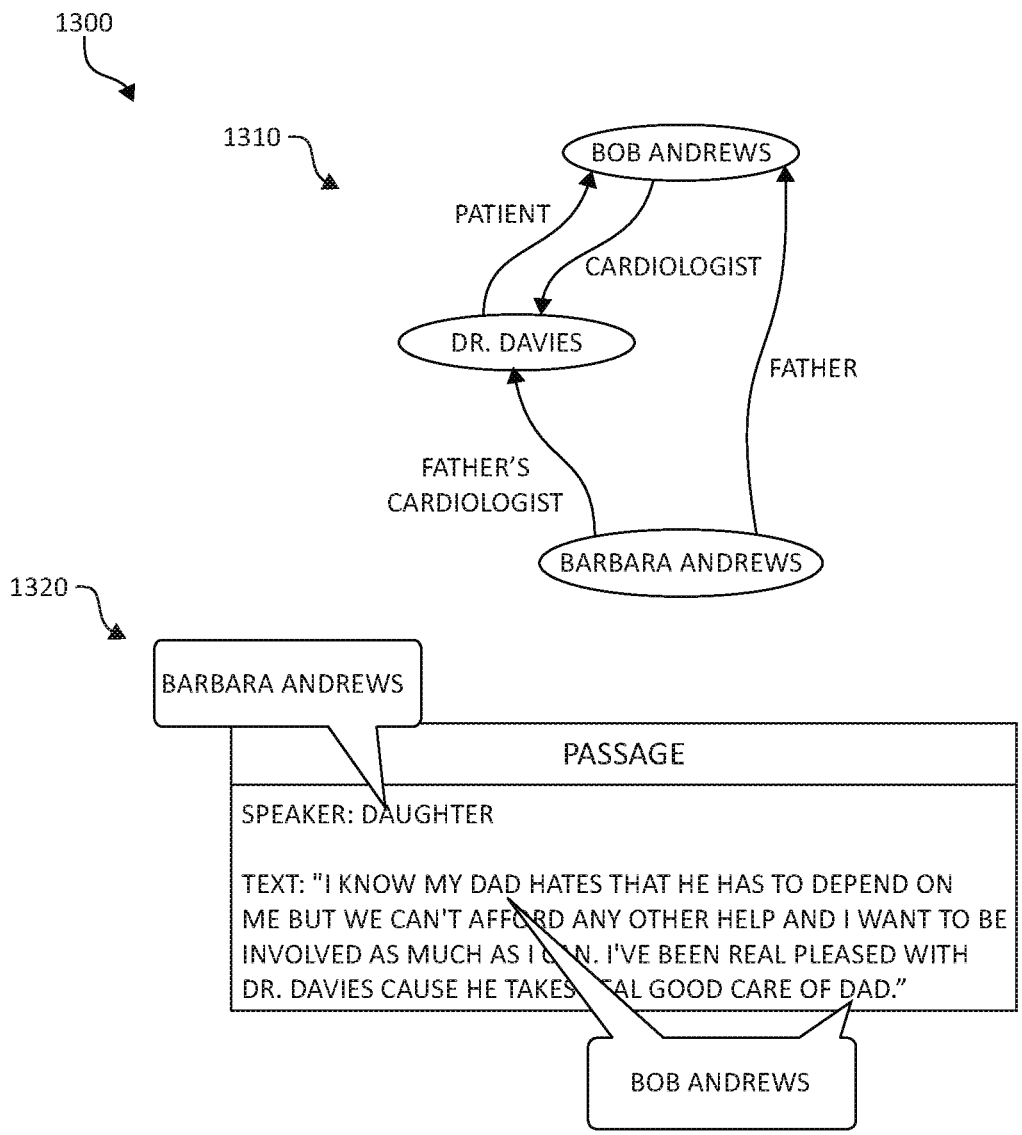
FIG. 13 is a diagram depicting an exemplary operation for reference by relationship resolution in accordance with aspects of the present invention.

FIG. 13 is a diagram 1300 depicting an exemplary operation for reference by relationship resolution. The reference by relationship resolution may include identifying one or more entities referred to by the relationship given the speaker of a passage 1320 and the person graph 1310. For example, upon completion of the speech attribution operation, which may annotate the entity with an indication of being the author or speaker of the extracted text 1320, the person graph 1310 may be used to identify references to persons and relationships and may be resolved, as in the passage 1320. Accordingly, it is now possible, for example, to determine that "my dad" or "dad" refers to "Bob Andrews", as illustrated in passage 1320. More specifically, the reference-by-relationship resolution 1300 may identify an entity that is only mentioned through his/her relationship to the speaker. For example, "my dad" may be identified as representing Bob Andrews, as illustrated in passage 1320.

FIG. 14 is a diagram 1400 depicting an exemplary operation for sentiment input extraction. In one aspect, each passage or passage fragment may be extracted and the text passages may be annotated with each of the references as described herein. In one aspect, the input may be fully annotated text passages with all references resolved and the speaker associated with each passage. The objective may be to extract fragments of text, each pertaining to two persons, which may be analyzed for sentiment, using the following rule: 1) if a speaker is anonymous, the text fragment must contain two different person(s) mentions, and/or 2) if speaker is a person of interest, then the text must mention one person different from the speaker.

In one aspect, the identity of the speaker/author of the text data may be identified, such as identifying a "daughter" of a person as a speaker of passage fragments 1420 including fragment 1, fragment 2, and/or fragment 3 that have been extracted from passage 1410. The text data that pertains to at least two entities may be extracted so that the sentiment relationship may be analyzed according to one or more factors or defined rules. For example, if the speaker/author is identified as "anonymous" or "null" the extracted text day should/must contain at least two indications or mentions of at least two entities. If the speaker/author is identified as an entity of interest, the extracted text data should/must include one or more indications or mentions of one entity that is different from the speaker/author entity. That is, the sentiment input extraction may identify fragments which have a sentiment relationship (e.g., text with sentiment described between person A and person B), and/or utterance from person A expressing sentiment about person B. Once these fragments have been identified they serve as the input to the sentiment extraction, which may determine the sentiment between A and B.

FIG. 15 is a diagram 1500 depicting an exemplary operation for sentiment extraction. In one aspect, the input data may be passage fragments 1420 extracted in FIG. 14, with a speaker and one or more entities/person mentions. The objective may be to extract the type and intensity of sentiment of the fragment and may be the sentiment between the persons the fragment is pertaining to. The output data may be a list of sentiment relationships 1510 (sentiment type and intensity) between a source ("SOURCE") and a target entity/person ("TARGET"), each with a confidence score ("CONF") and a relationship ("REL.") indicated with a positive sign/value "+" and/or a negative sign/value "−".

In one aspect, upon extracting text data (e.g., passage fragments 1420 as illustrated in FIG. 14) and identifying the speaker or author of the extracted text data, a type and intensity of sentiment of the text data or fragment may be extracted. The type and intensity of sentiment of the text data may be the sentiment relationship identified between the entities referred to and/or identified in the extracted text data. The list of sentiment relationships (sentiment type and intensity) between a source entity and a target entity may be provided as output in an interactive GUI display.

A "positive" sign/value may be provided to indicate a positive or favorable interpersonal relationship ("REL.") or a "negative" sign indicating a negative or unfavorable interpersonal relationship ("REL.") between the persons. The "positive" sign or the "negative" sign may be assigned to each indication or mention of the entities and may be extracted. A confidence score ("CONF") may be assigned and maintained for each sentiment relationships between the source entity and the target entity. That is, the positive sign and/or negative sign may have an associated confidence score indicating a percentage of accuracy of the sentiment relationship as being favorable ("positive" sign) or unfavorable ("negative" sign).

For example, a sentiment relationship may be identified as "positive" ("+") between the source entity "Barbara Andrews" and the target entity "Dr. Davies". The confidence score assigned to the identified sentiment relationship may be 0.9, which may be a percentage and/or a range of 0 up to 1. The sentiment relationship may be identified as "positive" ("+") between the source entity "Barbara Andrews" and the target entity "Dr. Cooper". The confidence score assigned to the sentiment relationship may be 0.4. The sentiment relationship may be identified as "negative" ("−") between the source entity "Barbara Andrews" and the target entity "Dr. Brown". The confidence score assigned to the sentiment relationship is 0.6. Also, given that sentiment relationships may change and evolve over time, the sentiment relationship may be identified on an alternative time period, which may include a time stamp relating to the positive value, negative value, and/or the confidence score.

In summary, the various components, modules, and systems as described herein provide for automatic discovery and characterization, and further analysis, of interpersonal relationships from a collection of unstructured text input. The various components, modules, and systems may take as input a collection of texts, and optionally, an external social graph (e.g., DbPedia, social network graph, patient relation data) and process the text to 1) identify named entities corresponding to persons, 2) perform co-reference resolution to identify instances where those persons are not referred to by their full names, detect mentions of interpersonal relations from the text, 3) analyze the text surrounding (e.g., associated with) interpersonal mentions to characterize the nature (sentiment, intensity, frequency, formality) of that relationship, and/or 4) provide, as output, a multigraph of the extracted information.

Figure 16:
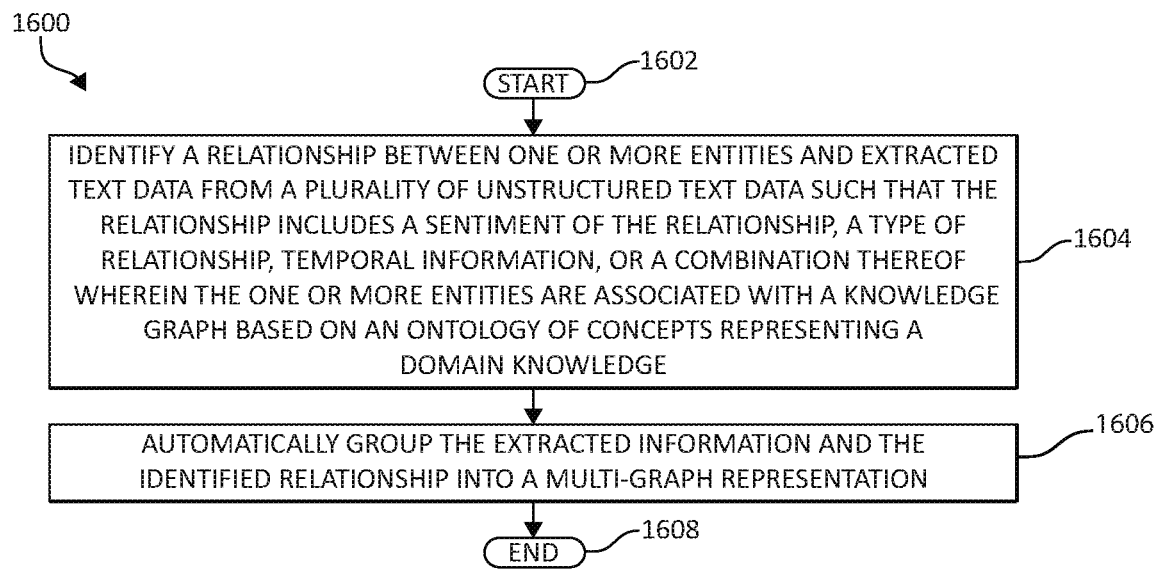
FIG. 16 is a flowchart diagram depicting an exemplary method for discovery, characterization, and analysis of interpersonal relationships from unstructured text data by a processor in which aspects of the present invention may be realized.

Turning now to FIG. 16, a method 1600 for discovery, characterization, and analysis of interpersonal relationships from unstructured text data by a processor is depicted, in which various aspects of the illustrated embodiments may be implemented. That is, FIG. 16 is a flowchart of an additional example method 1600 for discovery, characterization, and analysis of interpersonal relationships from unstructured text data in a computing environment according to an example of the present invention. The functionality 1600 may be implemented as a method executed as instructions on a machine, where the instructions are included on at least one computer readable medium or one non-transitory machine-readable storage medium. The functionality 1600 may start in block 1602. A relationship between one or more entities and extracted text data from a plurality of unstructured text data may be identified such that the relationship includes a sentiment of the relationship, a type of relationship, temporal information, or a combination thereof and the one or more entities are associated with a knowledge graph based on an ontology of concepts representing a domain knowledge, as in block 1604. The extracted information and the identified relationship may be automatically aggregated into a multi-graph representation, as in block 1606. The functionality 1600 may end in block 1608.

In one aspect, in conjunction with and/or as part of at least one block of FIG. 16, the operation of 1600 may include one or more of each of the following. The operation of 1600 may parse, prior to the identifying the relationship(s), through the plurality of unstructured text data in order to extract the extracted data. One or more entities may be linked to the extracted text data to create the relationship between one or more entities and extracted text data using the knowledge graph. A confidence score may be assigned to the sentiment of the relationship, the type of relationship, and the temporal information of the extracted data.

The operation of 1600 may detect each semantic indication referencing the sentiment of the relationship, the type of relationship, and the temporal information in order to determine the relationship and/or analyze additional text data sounding the extracted text data in the plurality of unstructured text to assist in determining the sentiment of the relationship, the type of relationship, and the temporal information.

The operation of 1600 may identify an indication in the plurality of unstructured text data that references the one or more entities, assign the indication to the one or more entities; perform a co-reference resolution for the one or more entities referenced in the plurality of unstructured text data by one or more incomplete semantic names relating to the indication; and/or perform a role resolution for the one or more entities by annotating the indication with a defined role of the one or more entities.

Figure 17:
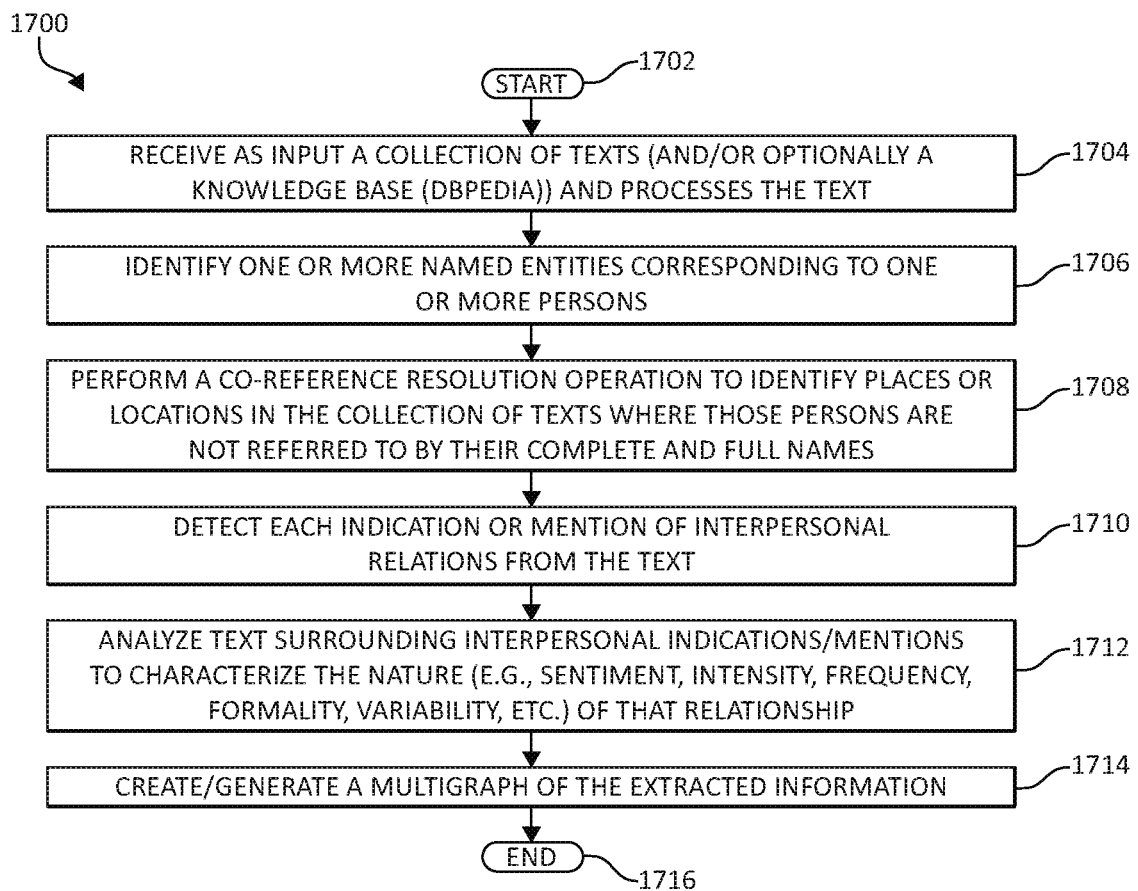
FIG. 17 is a flowchart diagram depicting an additional exemplary method for discovery, characterization, and analysis of interpersonal relationships from unstructured text data by a processor; again in which aspects of the present invention may be realized.

Turning now to FIG. 17, a method 1700 for discovery, characterization, and analysis of interpersonal relationships from unstructured text data by a processor is depicted, in which various aspects of the illustrated embodiments may be implemented. That is, FIG. 17 is a flowchart of an additional example method 1700 for discovery, characterization, and analysis of interpersonal relationships from unstructured text data in a computing environment according to an example of the present invention. The functionality 1700 may be implemented as a method executed as instructions on a machine, where the instructions are included on at least one computer readable medium or one non-transitory machine-readable storage medium. The functionality 1700 may start in block 1702. The functionality 1700 may receive as input a collection of texts (and/or optionally a knowledge base (DbPedia)) and processes the text, as in block 1704. One or more named entities corresponding to one or more persons may be identified, as in block 1706. A co-reference resolution operation may be performed to identify places or locations in the collection of texts where those persons are not referred to by their complete and full names, as in block 1708. Each indication or mention of interpersonal relations from the text may be detected, as in block 1710. The text surrounding (e.g. preceding text or subsequent text at a defined amount such as within one or more preceding paragraphs or one or more subsequent paragraphs of the text) interpersonal mentions may be analyzed to characterize the nature (e.g., sentiment, intensity, frequency, formality, variability, etc.) of that relationship, as in block 1712. A multigraph of the extracted information may be created and provided (as output data), as in block 1714. The functionality 1700 may end, as in block 1716.

In one aspect, in conjunction with and/or as part of at least one block of FIG. 17, the operation of 1700 may include one or more of each of the following. The operation of 1700 may link the one or more entities to the extracted text data to create the relationship between one or more entities and extracted text data using the knowledge graph, and/or associate an entry in the knowledge graph to each of the one or more entities in the extracted text data to analyze the relationship between one or more entities. A confidence score may be assigned to the sentiment of the relationship, the type of relationship, and the temporal information of the extracted data.

The operation of 1700 may display the multi-graph representation in an interactive graphical user interface (GUI), provide support to the user for analysis of the output data including reasoning (e.g., automatic analysis and/or interaction by a user) with a graph, aggregating along chosen dimensions and visualizing data over time, and/or provide provenance information to the user to allow for corrections and updates of the extracted information.

The operation of 1700 may detect each semantic indication (e.g., alphanumeric indication) referencing the sentiment of the relationship, the type of relationship, and the temporal information in order to determine the relationship, analyze additional text data associated the extracted text data in the plurality of unstructured text to assist in determining the sentiment of the relationship, the type of relationship, and the temporal information, and/or perform a role resolution for the one or more entities by annotating the indication associated with each respective entity.

As additional aspects of operation of functionality 1700, the operation of 1700 may enable a user to select a set of input texts to be analyzed and provide a user interface for users to reason (e.g., interact or automatically perform one or more operations as described herein) on the knowledge graph (knowledge propagation). The operation of 1700 may aggregate information (e.g., over time, over sentiment categories), and provide a visualization of temporal relations over time. The operation of 1700 may also scrutinize each atomic piece of extracted information underneath each relationship indication or mention (with the possibility of editing and/or correcting the atomic piece of extracted information).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for discovery and analysis of interpersonal relationships from a collection of unstructured text data, comprising:

identifying a relationship between one or more entities and extracted text data from a plurality of unstructured text data such that the relationship includes a sentiment of the relationship, a type of relationship, and temporal information indicative of a timeframe of events occurring over a duration of the relationship, wherein the relationship and a connection between the relationship and a partial name, title, or role of the one or more entities is identified by inference according to references contained only within the plurality of unstructured text data notwithstanding whether the relationship between the one or more entities is explicitly named within the extracted text data, and wherein the one or more entities may be associated with a knowledge graph based on an ontology of concepts representing a domain knowledge; and automatically aggregating the extracted text data and the identified relationship into a multi-graph representation, wherein the aggregating includes enhancing a social graph of the multi-graph representation according to aggregated sentiment information extracted over a defined time period, the sentiment information including qualitative descriptions of the relationship, wherein the qualitative descriptions include an intensity, a formality, and the duration of the relationship as evidenced by the temporal information indicative of the timeframe of events occurring over the duration of the relationship.

2. The method of claim 1, further including:

linking the one or more entities to the extracted text data to create the relationship between one or more entities and extracted text data using the knowledge graph; or associating an entry in the knowledge graph to each of the one or more entities in the extracted text data to analyze the relationship between one or more entities.

3. The method of claim 1, further including assigning a confidence score to the sentiment of the relationship, the type of relationship, and the temporal information of the extracted data.

4. The method of claim 1, further including, prior to the identifying, parsing the plurality of unstructured text data in order to extract the extracted data.

5. The method of claim 1, further including detecting each semantic indication referencing the sentiment of the relationship, the type of relationship, and the temporal information in order to determine the relationship.

6. The method of claim 1, further including analyzing additional text data associated with the extracted text data in the plurality of unstructured text to assist in determining the sentiment of the relationship, the type of relationship, and the temporal information.

7. The method of claim 1, further including:

identifying an indication in the plurality of unstructured text data that references the one or more entities;

assigning the indication to the one or more entities;

performing a co-reference resolution for the one or more entities referenced in the plurality of unstructured text data by one or more incomplete semantic names relating to the indication;

performing a reference by role resolution for the one or more entities by annotating the indication with a defined role of the one or more entities;

detecting a semantic reference of one or more interpersonal relationships between the one or more entities from the plurality of unstructured text data;

analyzing text data preceding and subsequent to the semantic reference in the plurality of unstructured text data to characterize a semantic relationship according to the sentiment, a frequency, emotional state, relationship hierarchy, or a combination thereof; or displaying the multi-graph representation in an interactive graphical user interface (GUI).

8. A system for discovery and analysis of interpersonal relationships from a collection of unstructured text data, comprising:

one or more computers with executable instructions that when executed cause the system to:

identify a relationship between one or more entities and extracted text data from a plurality of unstructured text data such that the relationship includes a sentiment of the relationship, a type of relationship, and temporal information indicative of a timeframe of events occurring over a duration of the relationship, wherein the relationship and a connection between the relationship and a partial name, title, or role of the one or more entities is identified by inference according to references contained only within the plurality of unstructured text data notwithstanding whether the relationship between the one or more entities is explicitly named within the extracted text data, and wherein the one or more entities may be associated with a knowledge graph based on an ontology of concepts representing a domain knowledge; and automatically aggregate the extracted text data and the identified relationship into a multi-graph representation, wherein the aggregating includes enhancing a social graph of the multi-graph representation according to aggregated sentiment information extracted over a defined time period, the sentiment information including qualitative descriptions of the relationship, wherein the qualitative descriptions include an intensity, a formality, and the duration of the relationship as evidenced by the temporal information indicative of the timeframe of events occurring over the duration of the relationship.

9. The system of claim 8, wherein the executable instructions:

link the one or more entities to the extracted text data to create the relationship between one or more entities and extracted text data using the knowledge graph; or associate an entry in the knowledge graph to each of the one or more entities in the extracted text data to analyze the relationship between one or more entities.

10. The system of claim 8, wherein the executable instructions assign a confidence score to the sentiment of the relationship, the type of relationship, and the temporal information of the extracted data.

11. The system of claim 8, wherein the executable instructions, prior to identifying the relationship, parse the plurality of unstructured text data in order to extract the extracted data.

12. The system of claim 8, wherein the executable instructions detect each semantic indication referencing the sentiment of the relationship, the type of relationship, and the temporal information in order to determine the relationship.

13. The system of claim 8, wherein the executable instructions analyze additional text data associated with the extracted text data in the plurality of unstructured text to assist in determining the sentiment of the relationship, the type of relationship, and the temporal information.

14. The system of claim 8, wherein the executable instructions:
identify an indication in the plurality of unstructured text data that references the one or more entities;
assign the indication to the one or more entities;
perform a co-reference resolution for the one or more entities referenced in the plurality of unstructured text data by one or more incomplete semantic names relating to the indication;
perform a reference by role resolution for the one or more entities by annotating the indication with a defined role of the one or more entities;
detect a semantic reference of one or more interpersonal relationships between the one or more entities from the plurality of unstructured text data;
analyze text data preceding and subsequent to the semantic reference in the plurality of unstructured text data to characterize a semantic relationship according to the sentiment, a frequency, emotional state, relationship hierarchy, or a combination thereof; or
display the multi-graph representation in an interactive graphical user interface (GUI).

15. A computer program product for, by a processor, discovery and analysis of interpersonal relationships from unstructured text data, the computer program product comprising a non-transitory computer-readable storage medium having computer-readable program code portions stored therein, the computer-readable program code portions comprising:
an executable portion that identifies a relationship between one or more entities and extracted text data from a plurality of unstructured text data such that the relationship includes a sentiment of the relationship, a type of relationship, and temporal information indicative of a timeframe of events occurring over a duration of the relationship, wherein the relationship and a connection between the relationship and a partial name, title, or role of the one or more entities is identified by inference according to references contained only within the plurality of unstructured text data notwithstanding whether the relationship between the one or more entities is explicitly named within the extracted text data, and wherein the one or more entities may be associated with a knowledge graph based on an ontology of concepts representing a domain knowledge; and
an executable portion that automatically aggregates the extracted text data and the identified relationship into a multi-graph representation, wherein the aggregating includes enhancing a social graph of the multi-graph representation according to aggregated sentiment information extracted over a defined time period, the sentiment information including qualitative descriptions of the relationship, wherein the qualitative descriptions include an intensity, a formality, and the duration of the relationship as evidenced by the temporal information indicative of the timeframe of events occurring over the duration of the relationship.

16. The computer program product of claim 15, further including an executable portion that:
links the one or more entities to the extracted text data to create the relationship between one or more entities and extracted text data using the knowledge graph; or
associates an entry in the knowledge graph to each of the one or more entities in the extracted text data to analyze the relationship between one or more entities.

17. The computer program product of claim 15, further including an executable portion that assigns a confidence score to the sentiment of the relationship, the type of relationship, and the temporal information of the extracted data.

18. The computer program product of claim 15, further including an executable portion that:
parses the plurality of unstructured text data in order to extract the extracted data prior to identifying the relationship; or
detects each semantic indication referencing the sentiment of the relationship, the type of relationship, and the temporal information in order to determine the relationship.

19. The computer program product of claim 15, further including an executable portion that analyzes additional text data associated with the extracted text data in the plurality of unstructured text to assist in determining the sentiment of the relationship, the type of relationship, and the temporal information.

20. The computer program product of claim 15, further including an executable portion that:
identifies an indication in the plurality of unstructured text data that references the one or more entities;
assigns the indication to the one or more entities;
performs a co-reference resolution for the one or more entities referenced in the plurality of unstructured text data by one or more incomplete semantic names relating to the indication;
detects a semantic reference of one or more interpersonal relationships between the one or more entities from the plurality of unstructured text data;
performs a reference by role resolution for the one or more entities by annotating the indication with a defined role of the one or more entities;
analyzes text data preceding and subsequent to the semantic reference in the plurality of unstructured text data to characterize a semantic relationship according to the sentiment, a frequency, emotional state, relationship hierarchy, or a combination thereof; or
displays the multi-graph representation in an interactive graphical user interface (GUI).

* * * * *